United States Patent
Hwang et al.

(10) Patent No.: US 11,644,906 B2
(45) Date of Patent: May 9, 2023

(54) HANDWRITING INPUT DEVICE

(71) Applicant: LG ELECTRONICS INC., Seoul (KR)

(72) Inventors: Hyokune Hwang, Seoul (KR); Younghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/429,507

(22) PCT Filed: Jun. 3, 2019

(86) PCT No.: PCT/KR2019/006652
§ 371 (c)(1),
(2) Date: Aug. 9, 2021

(87) PCT Pub. No.: WO2020/246626
PCT Pub. Date: Dec. 10, 2020

(65) Prior Publication Data
US 2022/0091684 A1    Mar. 24, 2022

(51) Int. Cl.
*G06F 3/01*    (2006.01)
*G06F 3/0354*    (2013.01)
(Continued)

(52) U.S. Cl.
CPC .......... *G06F 3/03542* (2013.01); *G06F 3/017* (2013.01); *G06F 3/0386* (2013.01); *H04W 4/80* (2018.02)

(58) Field of Classification Search
CPC .......... G06F 3/017; G06F 3/038; G06F 3/042; G06F 3/03542; G06F 3/0354; G06F 3/0346; G06F 3/0386; H04W 4/80
See application file for complete search history.

(56) References Cited

U.S. PATENT DOCUMENTS 5,902,968 A * 5/1999 Sato ..................... G06V 30/228
345/169
6,307,956 B1* 10/2001 Black ................... G06Q 20/341
713/186
(Continued)

FOREIGN PATENT DOCUMENTS

JP    2004028977 A *  1/2004  .......... G01B 11/002
KR   20030053521 A *  6/2003  ......... G06F 3/03545
(Continued)

*Primary Examiner* — Towfiq Elahi
(74) *Attorney, Agent, or Firm* — Birch, Stewart, Kolasch & Birch, LLP

(57) ABSTRACT

A handwriting input device having the shape of a digital pen, according to one embodiment of the present invention, comprises: a pen tip formed on one side of the pen; a light source part for irradiating coherent light to a surface around the pen tip; first and second image sensors for respectively sensing coordinate components necessary for calculating movement coordinates of the pen according to a user's handwriting input by using at least a portion of the coherent light reflected from the surface and received; and a processor for calculating the movement coordinates of the pen by using the coordinate components sensed through the first and second image sensors, wherein the first and second image sensors are disposed such that the distances between each sensor and the pen tip are the same.

19 Claims, 10 Drawing Sheets

(a)

(b)

(51) Int. Cl.
*H04W 4/80* (2018.01)
*G06F 3/038* (2013.01)

(56) References Cited

U.S. PATENT DOCUMENTS

| | | | |
|---|---|---|---|
| 2002/0148655 A1 | 10/2002 | Cho et al. | |
| 2012/0212459 A1* | 8/2012 | Rusu | G06V 40/30 |
| | | | 345/179 |
| 2014/0062964 A1* | 3/2014 | Nagaoka | G06F 3/0321 |
| | | | 345/175 |

FOREIGN PATENT DOCUMENTS

| | | | | |
|---|---|---|---|---|
| KR | 10-2004-0032477 A | | 4/2004 | |
| KR | 20040032477 A | * | 4/2005 | ........... G06F 3/0316 |
| KR | 10-2010-0012701 A | | 2/2010 | |
| KR | 10-2010-0050896 A | | 5/2010 | |
| KR | 10-1637241 B1 | | 7/2016 | |

* cited by examiner (a)

(b)

(a)

(b)

(a)

(b)

Motion due to sensor inclination (a)

$$dL = \sqrt{dx^2 + dy^2 + dz^2}$$

In-plane sliding after movement dx (b)

First image sensor
$dX = dx + R \times d\varphi$
$dY = dy + R \times d\xi$ $\Rightarrow$ $dx = (dX-dX')/(1-1/\cos(\Phi))$
$dy = -dY + R \times d\xi$
$dz = -dx \times \tan(\Phi)$ — Pen inclination angle Second image sensor
$dX' = dx' + R \times d\varphi$
$dY' = dy' + R \times d\xi$

HANDWRITING INPUT DEVICE

CROSS REFERENCE TO RELATED APPLICATIONS

This application is the National Phase of PCT International Application No. PCT/KR2019/006652, filed on Jun. 3, 2019, all of which is hereby expressly incorporated by reference into the present application.

TECHNICAL FIELD

The present disclosure relates to a handwriting input device, and more particularly, to a handwriting input device corresponding to a light positioning device that uses a coherence ray such as laser.

BACKGROUND ART

FIG. 1 is a diagram showing a handwriting input process of a handwriting input device interworking with a conventional display device.

FIG. 2 is a diagram showing a process for recognizing movement coordinates of a pen in response to a user handwriting input using a laser speckle of the related art.

FIG. 3 and FIG. 4 are diagrams to describe a problem caused in recognizing movement coordinate recognition of a pen in response to a user handwriting input using a single image sensor according to a related art.

Referring to FIGS. 1 to 4, regarding methods of recognizing movement coordinates of a digital pen (i.e., handwriting input device) in response to a user's current handwriting input, used currently are an on-display method of recognizing the digital pen using a sensor layer stacked on a screen of an external display device interworking with the digital pen [FIG. 1 (*a*)] and an off-display method of recognizing movement coordinates by the digital pen by itself using a laser speckle and then transmitting the coordinates to an external display device [FIG. 1 (*b*).

Particularly, as display devices usable in extended spaces such as Virtual Reality (VR), Augmented Reality (AR) and Mixed Reality (MR) have been developed, the need for the off-display method that requires no additional device to enable user handwriting at various locations is rising.

The coordinate recognition of a digital pen according to the above off-display method may recognize coordinates using a speckle image generated by surficial diffused reflection of coherency secured laser.

Namely, as shown in FIG. 2 (*a*) and FIG. 2 (*b*), in case that a laser of a single wavelength is applied to a surface to record, the laser overlaps mutually at a specific location by reflection on the surface. In this case, if an image sensor recognizing a laser speckle image is disposed at the specific location, it receives speckle images, of which brightness is maintained uniformly but randomly by the light of the overlapping laser.

If the speckle images received by the image sensor are compared with each other by a period Δt, the number of pixels to which the speckle image has moved and can be converted into a distance in which the image sensor has moved by multiplying a distance of the pixel.

Yet, as shown in FIG. 3 (*a*) and FIG. 3 (*b*), when a light source unit applying a laser beam to a surface to record and a single image sensor are disposed in the same plane, as shown in FIG. 3 (*a*), although a reflective surface has moved to B from A, the same wave is received by the image sensor.

For the same reason, as shown in FIG. 3 (*b*), although a single image sensor has moved to B from A, there is no change of an image. Hence, a moving distance dx on x-axis and a moving distance dy on y-axis in a plane can be measured but a movement in a moving distance dx on z-axis cannot be measured.

For this reason, a speckle image sensor of the related art has been applied only to a product having x- and y-axial movements existing in a plane only.

In addition, as shown in FIG. 4 (*a*) and FIG. 4 (*b*), in case that an image sensor inclined by φ makes a translational motion of dL, this plane becomes the same as sliding by dx after moving dz.

Due to this issue, it causes a problem that a measurement smaller by 'dx=dL×cos(φ)' is made without measurement by dL. In this case, if dz is calculable, DL can be perfectly found despite that an image sensor is inclined, thereby calculating coordinates of a pen tip using a translation motion of the image sensor.

An actual movement value dL is a root of a sum of squares of dx and dy, which are on an image sensor, and dz that is not measured. Hence, if dz is known, it may obtain a final inclined state of a pen by calculating an angle between each direction of y- and x-axes and a gravity direction. However, there is a problem that it is unable to calculate dx with a single image sensor currently.

DISCLOSURE OF THE INVENTION

Technical Task

One technical task of the present disclosure is to provide a handwriting input device of a digital pen type that generates movement coordinates by itself in response to a user's handwriting input using a coherence ray.

Another technical task of the present disclosure is to provide a handwriting input device having a structure including dual first and second image sensors.

Another technical task of the present disclosure is to provide a handwriting input device that simplifies a movement coordinate operation in response to a user's handwriting via a structure having first and second image sensors.

Further technical task of the present disclosure is to provide a handwriting input device capable of calculating accurate movement coordinates in a manner of sensing moving distances of a pen on 3 axes (x, y, z) via first and second image sensors and also sensing an inclined angle of the pen via an acceleration sensor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present disclosure, provided is a handwriting input device in shape of a digital pen, the handwriting input device including a pen tip formed on one side of the pen, a light source unit applying a coherence ray to a surface around the pen tip, first and second image sensors sensing coordinate components required for movement coordinates calculation of the pen in response to a user's handwriting input based on at least one portion of the coherence ray received by reflecting from the surface, respectively, and a processor calculating movement coordinates of the pen based on the coordinate components sensed via the first and second image sensors, wherein the first and second image sensors may be disposed to have a same distance from the pen tip.

The pen tip may be disposed to be eccentric upward from a center of the pen.

The light source unit may be disposed between the first and second image sensors.

The first and second image sensors may be disposed to form a prescribed angle in between so as to have the same distance from the pen tip. Namely, the first image sensor may be disposed vertical to an axis making the pen tip as a reference point and the second image sensor may be disposed in a manner of being inclined to for the prescribed angle with the first image sensor.

The first and second image sensors may be disposed in a manner that normal vectors of centers of the first and second image sensors meet each other at the pen tip in the same distance.

The handwriting input device may further include an input sensor provided to the pen tip. The processor may initialize the movement coordinates of the pen based on determining that the pen tip touches the surface at a pressure level equal to or higher than a preset pressure level via the pressure sensor and calculate the movement coordinates of handwriting by cumulating the coordinate components sensed via the first and second image sensors.

The coordinate components may include moving distances, sensed by the first and second image sensors, on 3 axes (x, y, z) of the pen and an inclination angle of the pen to a gravity direction. In this case, the handwriting input device may further include an acceleration sensor, and the inclination angle of the pen may be obtained via the acceleration sensor.

The handwriting input device may further include a short-range communication unit performing short-range communication with an external display device interworking with the handwriting input device. In this case, the processor may control the short-range communication unit to transmit information including the calculated movement coordinates of the pen to the external display device.

Technical solutions obtainable from the present invention are non-limited by the above-mentioned technical solutions. And, other unmentioned technical solutions can be clearly understood from the following description by those having ordinary skill in the technical field to which the present invention pertains.

Advantageous Effects

Accordingly, the present disclosure provides the following effects/advantages.

According to one of various embodiments of the present disclosure, a movement coordinate operation in response to a user's handwriting is simplified via a structure having first and second image sensors.

According to one of various embodiments of the present disclosure, accurate movement coordinates can be calculated in a manner of sensing moving distances of a pen on 3 axes (x, y, z) via first and second image sensors and also sensing an inclined angle of the pen via an acceleration sensor.

Effects obtainable from the present disclosure may be non-limited by the above-mentioned effects. And, other unmentioned effects can be clearly understood from the following description by those having ordinary skill in the technical field to which the present disclosure pertains.

DESCRIPTION OF DRAWINGS

FIG. 10 is a diagram to describe a pen movement coordinates calculating algorithm of a handwriting input device according to the present disclosure.

BEST MODE FOR INVENTION

Various embodiment(s) of a handwriting input device according to the present disclosure will be described with reference to the accompanying drawings.

The suffixes "module", "unit", etc. for the components used in this specification are given simply in consideration of the facilitation of preparation of the specification, and both may be interchangeably used as necessary. In addition, even when described as ordinal, such as "first-", "second-", etc., it is for the convenience of explanation of the term rather than for order, but not limited to such terms or ordinal. In addition, terms used in this specification have been selected in consideration of the functionality of the present disclosure's technical ideas, but this may vary depending on the intention or practice of those skilled in the art, to which the present disclosure pertains, or the appearance of new technologies. However, in certain cases, there are terms arbitrarily selected by the applicant, but the meaning thereof will be described in the relevant description section. Therefore, it should be stated that the term should be construed based on its practical meaning and the content described throughout this specification, not just its name. On the other hand, the content described in this specification or/and drawings is not limited to the preferred embodiment according to the present disclosure, and the scope of the rights shall be determined through the scope of the claims.

Below, with reference to FIGS. 5 to 10, a pen-shaped handwriting input device equipped with first and second image sensors according to the present disclosure will be described in detail. For clarity of the following description, the handwriting input device according to the present disclosure is described by being referred to as a pen.

Figure 1:
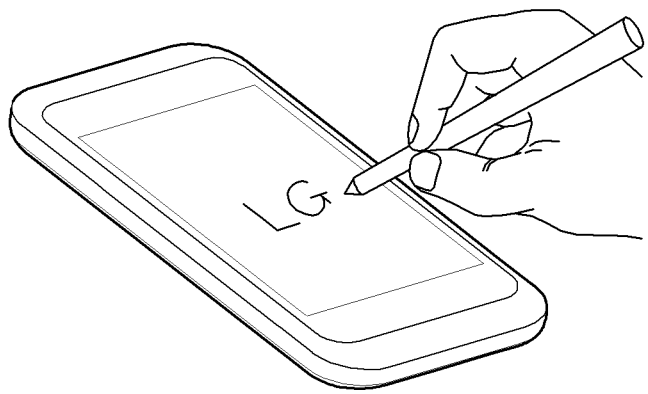
FIG. 1 is a diagram showing a handwriting input process of a handwriting input device interworking with a conventional display device.
Figure 1:
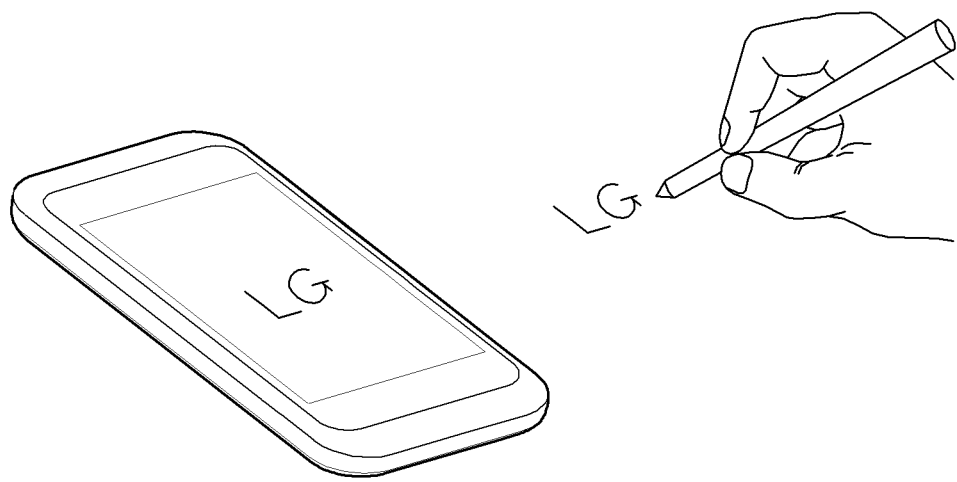
Figure 2:
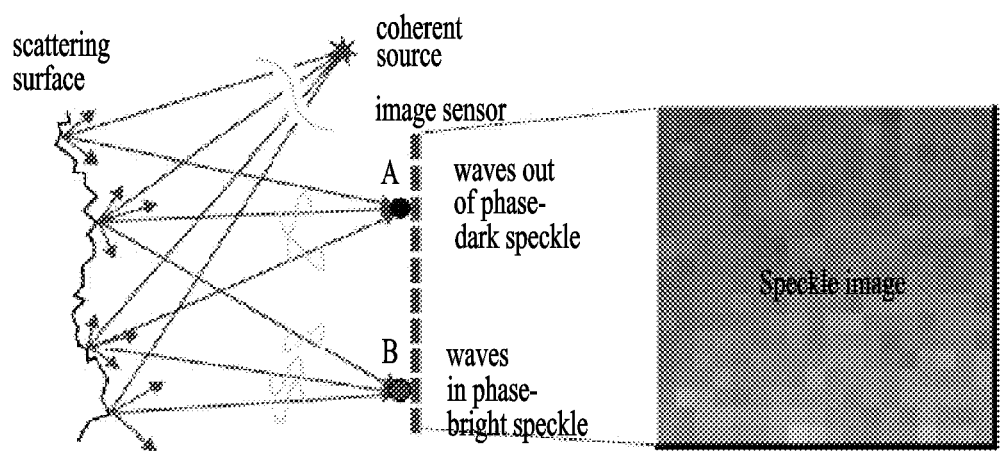
FIG. 2 is a diagram showing a process for recognizing movement coordinates of a pen in response to a user handwriting input using a laser speckle of the related art.
Figure 2:
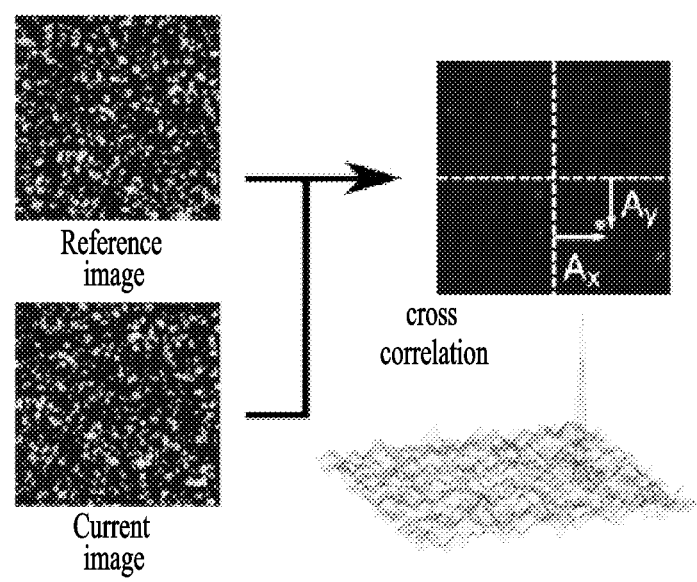
Figure 3:
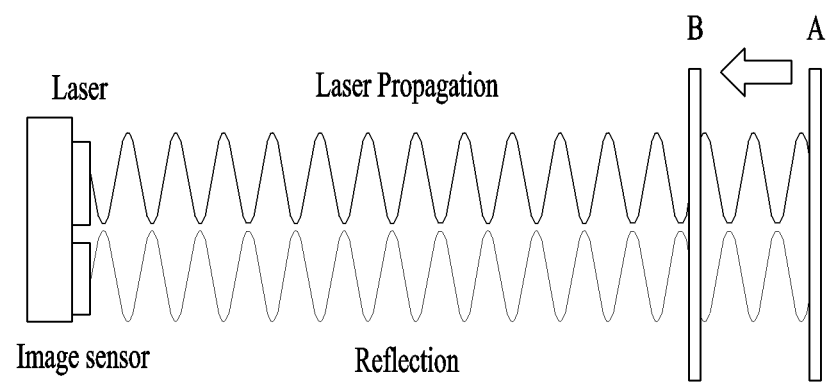
FIG. 3 and FIG. 4 are diagrams to describe a problem caused in recognizing movement coordinate recognition of a pen in response to a user handwriting input using a single image sensor according to a related art.
Figure 3:
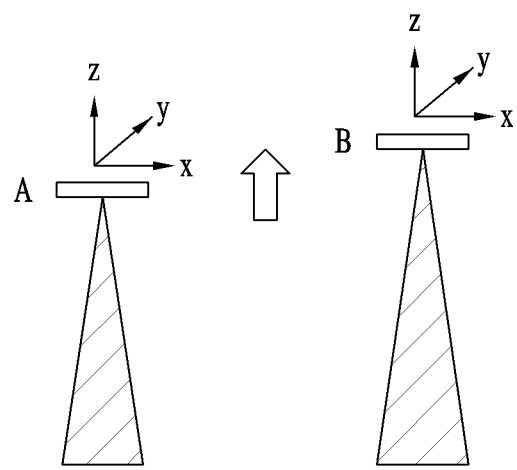
Figure 4:
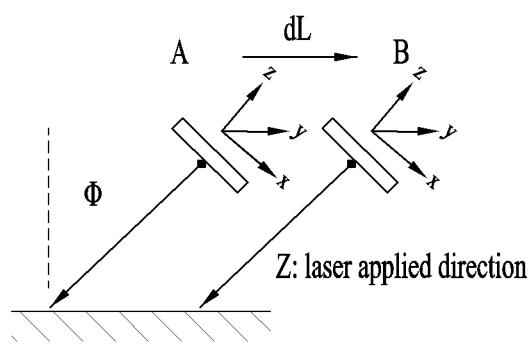
Figure 4:
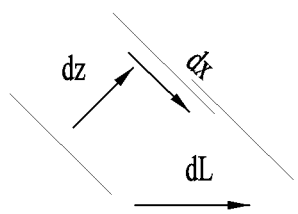
Figure 5:
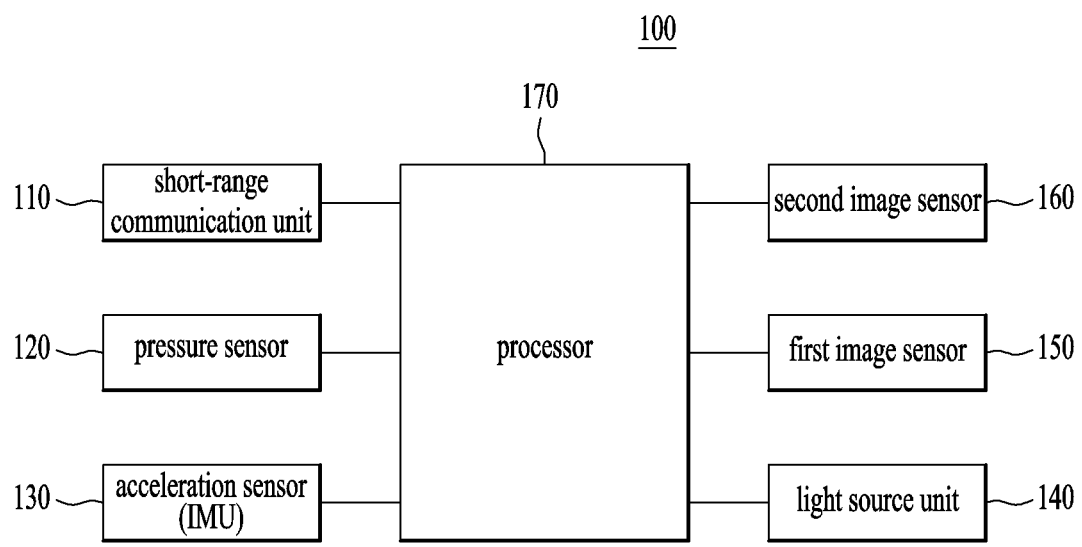
FIG. 5 is a block diagram of a handwriting input device having first and second image sensors according to one embodiment of the present disclosure.

FIG. 5 is a block diagram of a handwriting input device having first and second image sensors according to one embodiment of the present disclosure.

Figure 6:
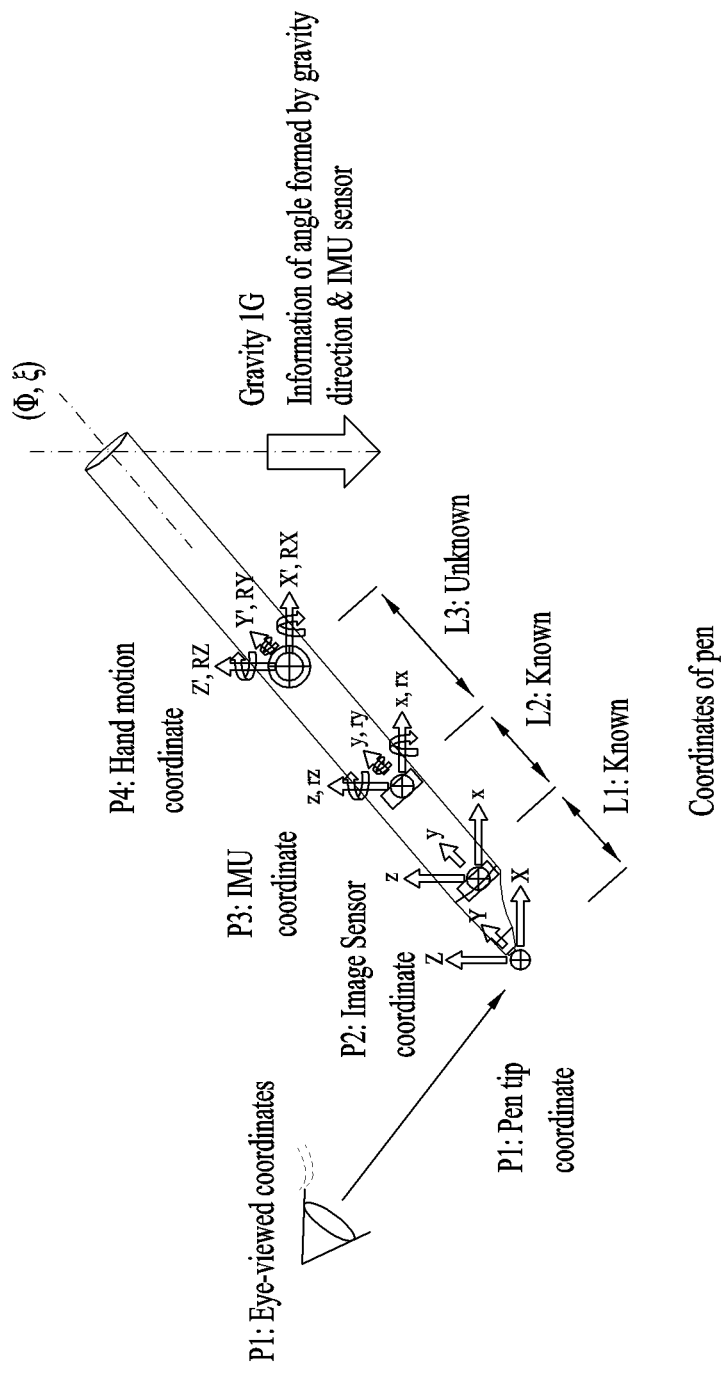
FIG. 6 is a diagram to describe handwriting coordinates of a handwriting input device according to the present disclosure.

FIG. 6 is a diagram to describe handwriting coordinates of a handwriting input device according to the present disclosure.

Figure 7:
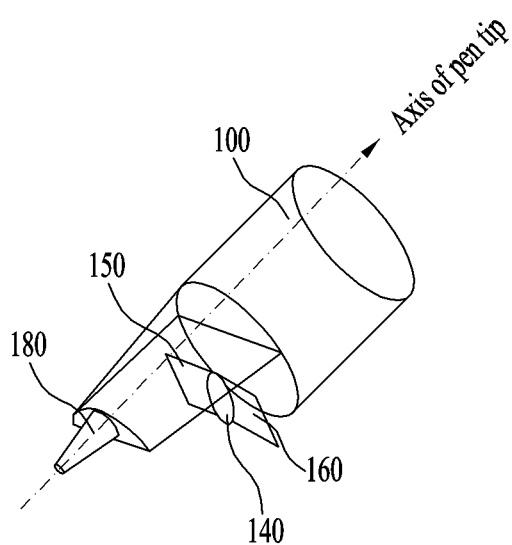
FIG. 7 is a diagram to describe a structure of a handwriting input device according to the present disclosure.
Figure 7:
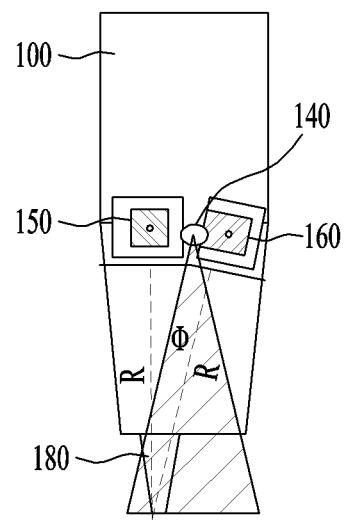

FIG. 7 is a diagram to describe a structure of a handwriting input device according to the present disclosure.

Figure 8:
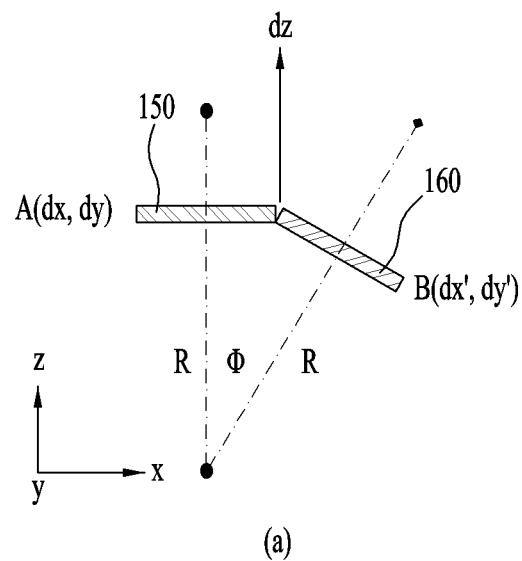
FIG. 8 is a diagram to describe a linear motion calculating process of a handwriting input device according to the present disclosure.
Figure 8:
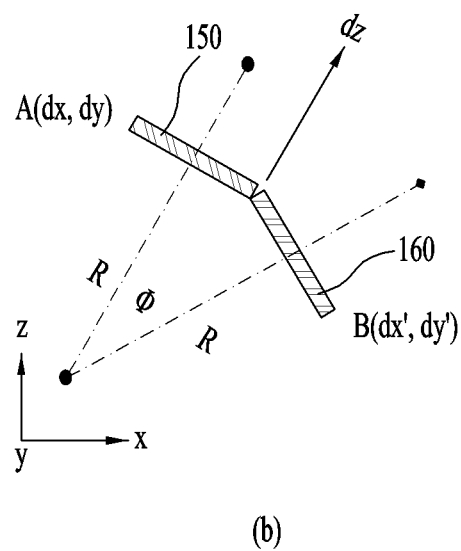

FIG. 8 is a diagram to describe a linear motion calculating process of a handwriting input device according to the present disclosure.

Figure 9:
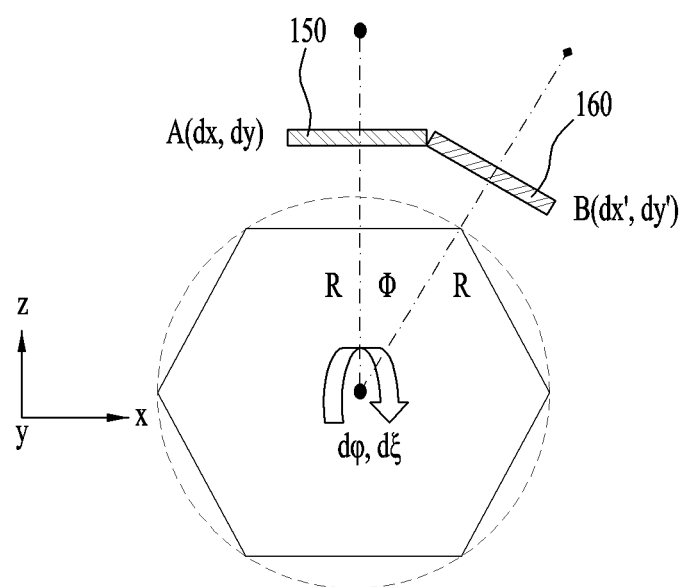
FIG. 9 is a diagram to describe a rotational motion calculating process of a handwriting input device according to the present disclosure.

FIG. 9 is a diagram to describe a rotational motion calculating process of a handwriting input device according to the present disclosure.

FIG. 10 is a diagram to describe a pen movement coordinates calculating algorithm of a handwriting input device according to the present disclosure.

First of all, referring to FIG. 5, a pen 100 according to the present disclosure includes a short-range communication unit 110, a pressure sensor 120, an acceleration sensor (IMU) 130, a light source unit 140, a first image sensor 150, a second image sensor 160 and a processor 170.

The short-range communication unit 110 is paired with an external display device. Each time movement coordinates of the pen 100 are generated and changed in response to a user's handwriting input, the short-range communication unit 110 transmits information containing the corresponding movement coordinates to the external display device under the control of the processor 170.

The external display device is paired with the pen 100 for short-range communication and displays visual graphic data corresponding to a handwriting content at a point on a screen corresponding to the movement coordinates received from the pen 100.

The above-described external display device may include at least one of a mobile phone, a smart phone, a notebook (or laptop) computer, a digital broadcast terminal, Personal Digital Assistants (PDA), a Portable Multimedia Player (PMP), a navigation, a slate PC, a tablet PC, an ultrabook, a digital TV, a desktop computer, and a wearable device (e.g., a smartwatch, smart glasses, a Head Mounted Display (HMD)).

As the short-range communication technology of the short-range communication unit 110, at least one of Bluetooth, RFID, IrDA, UWB, ZigBee, RS-232, RS-385, etc. may be usable.

The pressure sensor 120 is disposed at a tip of the pen tip 180 of the pen 100. When the pen tip 180 touches a surface of a handwriting inputted object by a user's handwriting action, the pressure sensor 120 senses a pressure level and then transmits it to the processor 170. If determining that the pen tip 180 touches the surface at the pressure level higher equal to or higher than a preset pressure level via the pressure sensor 120, the processor 170 may initialize the movement coordinates of the pen 100 and then calculate handwriting movement coordinates by cumulating coordinate components sensed via the first and second image sensors 150 and 160.

The acceleration sensor IMU 130 senses an inclination angle of the pen 100 to a gravity direction and then transmits it to the processor 170. Particularly, the acceleration sensor 130 transmits an angle ($\varphi$, $\xi$) between each of the first and second image sensors 150 and 160 and the gravity direction to the processor 170 by sensing an inclination angle of the pen 100.

The light source unit 140 applies a laser beam diverging without a condensing lens configuration or a laser beam having a specific diameter with a condensing lens configuration as a coherence ray to a surface (i.e., a scattering surface) around the pen tip 180. In this case, the light source unit 140 is disposed between the first and second image sensors 150 and 160 described in the following.

The first image sensor 150 receives at least one portion of a laser beam, which is applied to a surface (i.e., a scattering surface) by the light source unit 140 and then reflects from the surface, and then senses coordinate components required for the movement coordinate calculation of the pen 100 in response to a user's handwriting input using the received at least one portion of the laser beam.

The second image sensor 160 receives at least one portion of a laser beam, which is applied to a surface (i.e., a scattering surface) by the light source unit 140 and then reflects from the surface, and then senses coordinate components required for the movement coordinate calculation of the pen 100 in response to a user's handwriting input using the received at least one portion of the laser beam.

The processor 170 controls overall operations of the pen 100 according to the present disclosure, calculates movement coordinates of the pen 100 using coordinate components sensed via the first and second image sensors 150 and 160, and transmits information including the calculated movement coordinates of the pen 100 to an external display device via the short-range communication unit 110.

FIG. 6 is a diagram to describe handwriting coordinates of a handwriting input device according to the present disclosure.

Referring to FIG. 6, a pen has been used for recording purposes for thousands of years, and the most important coordinates of the pen may be the coordinates P1 of a pen tip for actually writing letters on a surface.

Therefore, if 3D coordinates resulting from moving the coordinates P1 of the pen tip can be found consecutively, it may become a pen technology available for handwriting on various surfaces.

Among the 3D coordinates resulting from moving the coordinates P1 of the pen tip, if a writing pressure is applied, it may correspond to a writing action. If there is no writing pressure, it may correspond to a hovering action. Namely, the act of writing is completed only if both of the writing action and the hovering action exist.

Since the pen makes a translational motion and a rotational motion by a user's hand, the coordinates P1 of the pen tip, the coordinates P2 of the first and second image sensors, the coordinates P3 of the acceleration sensor, and the hand action coordinates P4, which are shown in FIG. 6, are interrelated with each other.

Namely, writing letters with a pen is a translational motion and a rotational motion of a pen centering around the coordinates P1 is unable to make a letter. Thus, it is necessary to obtain an accurate translational motion value of P1 in order to accurately calculate the movement coordinates corresponding to handwriting.

Namely, a physical ink generated pen has absolute coordinates for a user to check the coordinates P1 with eyes. Yet, like the present disclosure, an optical pen employs a relative coordinate system of calculating movement coordinates by itself using a laser beam.

Therefore, if a rotation amount of the first and second image sensors centering on P1 is subtracted from a linear movement amount of the coordinates P2 of the first and second image sensors, a linear movement amount corresponding to a user's actual handwriting action can be found.

FIG. 7 is a diagram to describe a structure of a handwriting input device according to the present disclosure.

As shown in FIG. 7 (a), when letters are written, the pen 100 is moved with reference to the pen tip 180. Hence, an axis of the pen 100 is defined with reference to the pen tip 180. Namely, the pen tip 180 is disposed in a manner of being eccentric upward from a center of the pen 100.

As shown in FIG. 7 (b), a pair of the first image sensor 150 and the second image sensor 160 are disposed within the pen 100, and the light source unit 140 is disposed between the first and second image sensors 150 and 160, thereby applying a laser bean diverging without a condensing lens configuration or a laser beam having a specific diameter with a collecting lens configuration from the center of the first and second image sensors 150 and 160.

In this case, the first and second image sensors 150 and 160 may be disposed to form a prescribed angle to have the same distance R from the pen tip 180.

Particularly, the first image sensor 150 may be disposed vertical to an axis with reference to the pen tip 180, and the second image sensor 160 may be disposed in a manner of being inclined to form the prescribed angle with the first image sensor 150 so as to have the same distance from the pen tip as the first image sensor 150.

Consequently, the first and second image sensors 150 and 160 are disposed in a manner that normal vectors of centers of the first and second image sensors 150 and 160 meet each other at the pen tip 180 with the same distance.

Via the above-described structure of the disposition between the pent tip 180 and the first and second image sensors 150 and 160 in FIG. 7, a motion may be calculated with a moving distance dz on a z-axis in a space as well as equations for a linear motion calculation of a pen shown in FIG. 8, a rotational motion calculation of a pen shown in FIG. 9, and a coordinates calculation of a pen tip shown in FIG. 10 may be simplified.

FIG. 8 is a diagram to describe a linear motion calculating process of a handwriting input device according to the present disclosure.

FIG. 8 (a) shows coordinates between the first image sensor A 150 and the second image sensor B 160 move, FIG. 8 (b) shows coordinates after the first image sensor A 150 and the second image sensor B 160 have moved, and Equation 1 in the following represents coordinates of the first image sensor A 150 and the second image sensor B 160 when the first image sensor A 150 and the second image sensor B 160 make a linear motion by dz together.

$$dx=dx' \times \cos(\Phi)$$

$$dz=dx' \times \sin(\Phi)$$

$$dy=dy'$$ [Equation 1]

As described above, if the first image sensor A 150 and the second image sensor B 160 move together by dz, the first image sensor A 150 has no coordinate change, the second image sensor B 160 has an occurrence of displacement like Equation 2 in the following, and the first image sensor A 150 and the second image sensor B 160 are disposed in a manner of sharing the y-axis, whereby, as described above, the equations for the coordinates calculation of the pen tip 180 is advantageously simplified.

$$dz=dx' \times \cos(90-\Phi)=-dx' \times \sin(\Phi)$$ [Equation 2]

FIG. 9 is a diagram to describe a rotational motion calculating process of a handwriting input device according to the present disclosure.

Referring to FIG. 9, a rotational motion of the pen 100 in a state of contacting with a surface of the pen tip 180 is the same as a motion of a sphere that rotates centering around the pen tip 180.

In this case, in the present disclosure, since the first image sensor A 150 and the second image sensor B 160 are disposed in a manner that the two normal vectors of the first image sensor A 150 and the second image sensor B 160 should meet each other at the pen tip 180, the spherical motion in a system of cumulating coordinates with periodicity Δt of a specific time interval.

Namely, the spherical motion relates to a situation that a direction of a beam continuously changes little by little (such situation may be regarded as a polygonal motion), which generates numerical values similar to Equation 3.

$$dx \sim dx' \sim R \times d\phi$$ [Equation 3]

$$dz \sim O$$

$$dy \sim dy' \sim R \times d\xi$$

FIG. 10 is a diagram to describe a pen movement coordinates calculating algorithm of a handwriting input device according to the present disclosure.

In case that the first image sensor A 150 and the second image sensor B 160 are disposed in the structure shown in FIG. 7, the equations shown in FIG. 10 may be obtained. Here, dX and dY are the values outputted from the first image sensor A 150 and the second image sensor B 160, respectively, and dx and dy are values resulting from actually moving the first image sensor A 150 and the second image sensor B 160, respectively.

Regarding each of the first image sensor A 150 and the second image sensor B 160, a coordinate variation value by a rotational motion of the pen 100 and a coordinate variation value by a linear motion of the pen 100 are generated in a manner of being mixed together, as shown in FIG. 10. Here, if the linear motion is detached therefrom, an inclination angle of the pen 100 to the gravity direction becomes insufficient.

Therefore, according to the present disclosure, an inclination angle of the pen 100 to the gravity direction is obtained via the acceleration sensor 130, and the processor 170 calculates the movement coordinates of the pen 180 using the coordinate components dx, dy and dz obtained by the first image sensor A 150 and the second image sensor B 160 and the equations shown in FIG. 10 and the inclination angle of the pen 100 obtained via the acceleration sensor 130.

As described above, a handwriting input device disclosed in the present disclosure may not be limited to the configuration of the embodiments described above, but may optionally be configured in a combination of all or some of the embodiments so that various modifications or variations can be made.

While the present invention has been described and illustrated herein with reference to the preferred embodiments thereof, it will be apparent to those skilled in the art that various modifications and variations can be made therein without departing from the spirit and scope of the invention. Moreover, the modifications and variations should not be individually understood from the technical idea of the present invention.

What is claimed is:

1. A handwriting input device in shape of a digital pen, the handwriting input device comprising:
   a pen tip formed on one side of the pen;
   a light source unit configured to apply a coherence ray to a surface around the pen tip;
   first and second image sensors configured to sense coordinate components needed for movement coordinates calculation of the pen in response to a user's handwriting input based on at least one portion of the coherence ray received by reflecting from the surface, respectively; and
   a processor configured to calculate movement coordinates of the pen based on the coordinate components sensed via the first and second image sensors,
   wherein the first and second image sensors are disposed to have a same distance from the pen tip and are disposed at different angles relative to an axis defining the pen tip.

2. The handwriting input device of claim 1, wherein the pen tip is disposed to be eccentric upward from a center of the pen.

3. The handwriting input device of claim 1, wherein the light source unit is disposed between the first and second image sensors.

4. The handwriting input device of claim 1, wherein the first and second image sensors are disposed to form a prescribed angle in between so as to have the same distance from the pen tip.

5. A handwriting input device in shape of a digital pen, the handwriting input device comprising:
   a pen tip formed on one side of the pen;
   a light source unit configured to apply a coherence ray to a surface around the pen tip;
   first and second image sensors configured to sense coordinate components required for movement coordinates calculation of the pen in response to a user's handwriting input based on at least one portion of the coherence ray received by reflecting from the surface, respectively; and
   a processor configured to calculate movement coordinates of the pen based on the coordinate components sensed via the first and second image sensors,
   wherein the first and second image sensors are disposed to have a same distance from the pen tip,
   wherein the first and second image sensors are disposed to form a prescribed angle in between so as to have the same distance from the pen tip, and
   wherein the first image sensor is disposed vertical to an axis making the pen tip as a reference point and wherein the second image sensor is disposed in a manner of being inclined to form the prescribed angle with the first image sensor.

6. The handwriting input device of claim 1, wherein the first and second image sensors are disposed in a manner that normal vectors of centers of the first and second image sensors meet each other at the pen tip in the same distance.

7. The handwriting input device of claim 1, further comprising an input sensor provided to the pen tip,
   wherein the processor initializes the movement coordinates of the pen based on determining that the pen tip touches the surface at a pressure level equal to or higher than a preset pressure level via the pressure sensor and calculates the movement coordinates of handwriting by cumulating the coordinate components sensed via the first and second image sensors.

8. The handwriting input device of claim 1, wherein the coordinate components include moving distances, sensed by the first and second image sensors, on 3 axes (x, y, z) of the pen and an inclination angle of the pen to a gravity direction.

9. The handwriting input device of claim 8, further comprising an acceleration sensor, wherein the inclination angle of the pen is obtained via the acceleration sensor.

10. The handwriting input device of claim 1, further comprising a short-range communication unit configured to perform short-range communication with an external display device interworking with the handwriting input device,
    wherein the processor controls the short-range communication unit to transmit information including the calculated movement coordinates of the pen to the external display device.

11. A handwriting input device in shape of a digital pen, the handwriting input device comprising:
    a pen tip;
    a pressure sensor disposed at the pen tip, the pressure sensor being configured to sense a pressure level of the pen tip;
    an acceleration sensor configured to sense an inclination angle of the pen to a gravity direction;
    a processor configured to:
      receive the pressure level from the pressure sensor; and
      receive the inclination angle of the pen from the acceleration sensor; and
    a light source unit configured to apply a laser beam to a surface; and
    first and second image sensors configured to sense coordinate components needed for movement coordinates calculation of the pen in response to a user's handwriting input based on at least one portion of the laser beam received by reflecting from the surface, respectively,
    wherein the processor is further configured to:
      in response to the pressure level being greater than a preset pressure level, initialize the movement coordinates of the pen and then calculate handwriting movement coordinates by cumulating the coordinate components sensed via the first and second image sensors.

12. The handwriting input device of claim 11, wherein the acceleration sensor transmits an angle between the first and second image sensors to the processor by sensing the inclination angle of the pen.

13. The handwriting input device of claim 11, wherein the light source unit is disposed between the first and second image sensors.

14. The handwriting input device of claim 11, wherein the first and second image sensors are disposed to have a same distance from the pen tip.

15. The handwriting input device of claim 11, wherein the first image sensor is disposed along a vertical axis making of the pen tip, and
    wherein the second image sensor is inclined with respect to the first image sensor.

16. The handwriting input device of claim 11, wherein the first and second image sensors are disposed in a manner that normal vectors of centers of the first and second image sensors meet each other at the pen tip in the same distance.

17. The handwriting input device of claim 11, wherein the light source unit applies the laser beam diverging without a condensing lens or applies the laser beam having a specific diameter with a condensing lens configuration as a coherence ray.

18. The handwriting input device of claim 11, further comprising a short-range communication unit configured to perform short-range communication with an external display device interworking with the pen,
- wherein the processor controls the short-range communication unit to transmit information including the calculated movement coordinates of the pen to the external display device.

19. The handwriting input device of claim 11, wherein the pen tip is disposed to be eccentric upward from a center of the pen.

\* \* \* \* \*